Jan. 12, 1965  L. MACKSOUD ETAL  3,165,216
SKID AND TRAILER COMBINATION
Filed Nov. 6, 1963
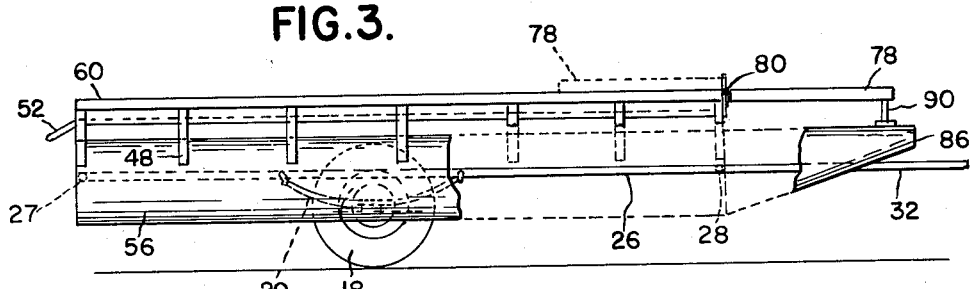
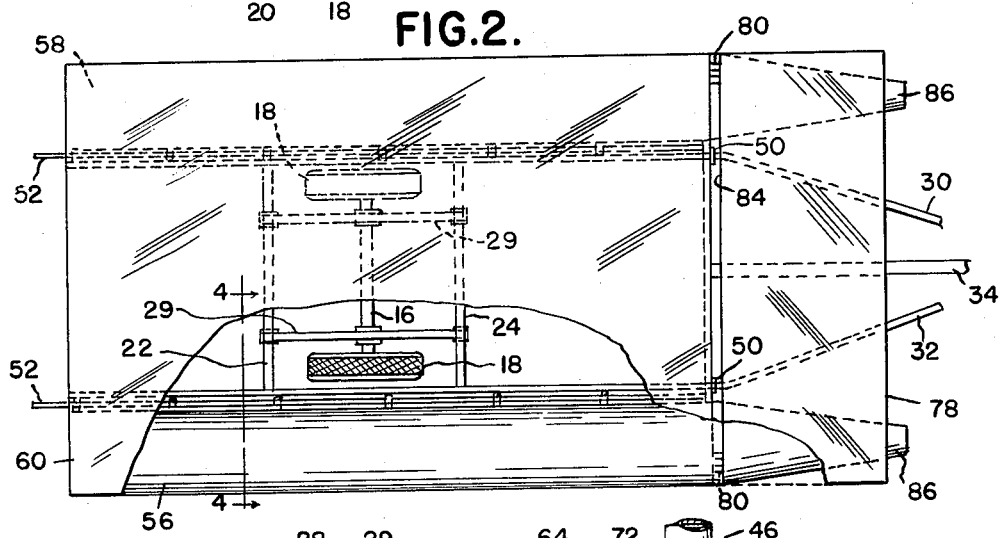
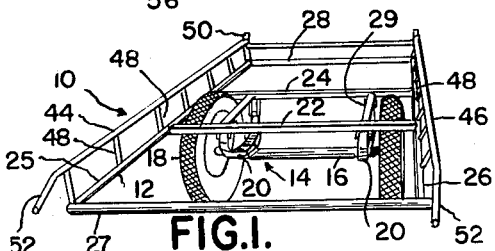
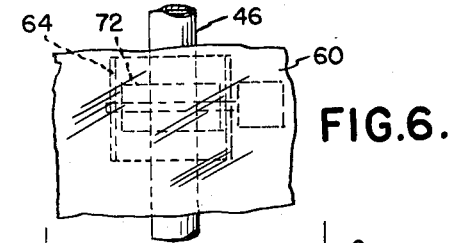
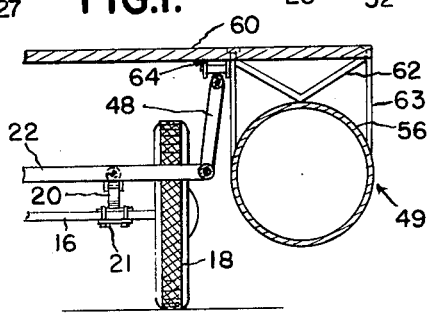
INVENTORS
LEO MACKSOUD
BY VICTOR CLAVICH
ATTORNEYS 3,165,216
SKID AND TRAILER COMBINATION
Leo Macksoud, 8629 Hupp St., Warren, Mich., and Victor Clavich, 18586 Old Homestead, Harper Woods, Mich.
Filed Nov. 6, 1963, Ser. No. 321,816
5 Claims. (Cl. 214—515)

The present invention relates to transportation equipment and more particularly relates to a novel skid and trailer combination. The trailer is adapted to be mounted on the rear of an automobile for transporting the skid to a place of use. As an example, the skid may take the form of a pontoon, houseboat, or other appropriate device as will subsequently appear.

It is an object of the present invention to provide transportation equipment comprising a trailer member and a skid member, said trailer member being provided with a frame and a ground engaging wheel, said skid member including a support and positioning means interposed between the support and the frame for removably mounting the skid member on the trailer member.

Another object of the present invention is to provide structure of the aforementioned type wherein latch means is carried by one of the members engageable with the other of the members for substantially preventing movement therebetween.

Still another object of the present invention is to provide structure of the aforementioned type wherein the positioning means includes track means on one of the members and roller means on the other of the members which is engageable with the track means.

A further object of the present invention is to provide transportation equipment comprising a trailer and a skid, said trailer including an elongated frame and at least one ground engaging wheel having an axis substantially perpendicular to the axis of the frame, a pair of longitudinally extending tracks at opposite sides of the frame and appropriately mounted thereon, said skid including a support and a plurality of transversely extending longitudinally spaced rollers on the under side of the support for each of the tracks, said skid being movable with respect to the trailer through the engagement of the rollers with the tracks.

A still further object of the present invention is to provide transportation equipment comprising a trailer and a skid, said trailer including an elongated frame and at least one ground engaging wheel having an axis substantially perpendicular to the axis of the frame, a pair of longitudinally extending tracks at opposite sides of the frame and appropriately mounted thereon, said tracks being spaced above the frame and extending substantially the entire length of the frame, said skid including a support and a pair of transversely spaced longitudinally extending channel shaped elements mounted on the bottom side of the support, each element being mounted on the support with the flanges thereof occupying vertical planes, and a plurality of transversely extending longitudinally spaced rollers carried by the flanges of each of the elements and engageable with one of the tracks, said skid being movable with respect to the trailer through the engagement of the rollers with the tracks.

Another object of the present invention is to provide structure of the aforementioned type wherein the front ends of the tracks include upwardly extending stop elements engageable with the support of the skid to substantially prevent lengthwise movement of the skid with respect to the trailer.

Still another object of the present invention is to provide a device of the aforementioned type wherein the back ends of the tracks are inclined downwardly to provide guide means for the skid when initially loading the skid onto the trailer.

It is thus another object of this invention to provide a low cost structure of the aforementioned type having certain advantages contributing to efficiency, reliability and long life as well as ease of maintenance.

Further objects and advantages of the present invention will be apparent from the following description, reference being had to the accompanying drawing wherein a preferred form of the present invention is clearly shown.

FIGURE 1 is a perspective view of the trailer.
FIGURE 2 is a plan view of the combined skid and trailer structure with certain portions of the skid-pontoon broken away to illustrate certain features of the invention.
FIGURE 3 is a side elevation of the structure illustrated in FIGURE 2, with certain portions of the skid-pontoon broken away.
FIGURE 4 is a sectional view taken substantially on the line 4—4 of FIGURE 2.
FIGURE 5 is an enlarged view of certain of the structure shown in FIGURE 4 and illustrating the cooperation between the rollers provided on the under side of the pontoon and the tracks carried on the trailer.
FIGURE 6 is a plan view of the structure illustrated in FIGURE 5.

The trailer 10 shown in the drawing comprises a sprung weight assembly in the form of a frame 12, and an unsprung weight assembly 14. The unsprung weight assembly 14 is shown in the present instance as having a single load carrying axle 16, although it will be understood as this description proceeds that additional load carrying axles may be provided on the vehicle or trailer 10 if desired. In any case, the load carrying axle 16 has a pair of ground engaging wheels 18 supported on opposite ends thereof in the usual manner.

Axle 16 is connected to the frame 12 by a pair of semi-elliptical leaf springs 20, respectively supported at opposite sides of the frame 12 for movement relative to the frame 12. As illustrated in the drawing, the adjacent ends of the springs 20 are appropriately connected to transversely extending struts 22 and 24, which form part of the frame 12, as is conventional in the art. The leaf springs 20 at opposite sides of the frame 12 are connected intermediate the ends thereof to the axle 16 by any suitable type of clamping means 21 which forms no part of the present invention and need not be described in detail.

The frame 12 which is of welded construction, is rectangular and includes a pair of longitudinally extending rails or bars 25 and 26. The ends of the bars 25 and 26 are connected by transversely extending braces 27 and 28 as best illustrated in FIGURE 1. The aforesaid struts 22 and 24 connect intermediate portions of the bars 25 and 26. In addition, the frame 12 includes a pair of longitudinally extending braces 29 which are interposed between struts 22 and 24.

Appropriately connected to the cross brace 28 are inclined struts 30 and 32 which are adapted to be connected to the centrally located connecting bar 34 in the usual manner. The bar 34 in turn carries anchor means, not shown, for connecting the trailer 10 to an automobile, truck or the like.

The portions of the trailer 10 described heretofore are old in the art and it should, of course, be appreciated that other component parts or designs may be utilized for the ones previously described.

The trailer 10 includes certain novel features. Mounted on the frame 12 and extending lengthwise parallel to the longitudinally extending rails or bars 25 and 26 are a pair of tracks 44 and 46. The tracks 44 and 46 as well as other parts of the frame 12 are usually made from steel pipe construction. The tracks 44 and 46 are spaced above the rails 25 and 26 and are interconnected thereto by means of relatively short substantially vertical struts 48. The struts 48 are connected on the lower ends thereof to the corresponding rail 25 or 26 by welding or other appropriate fastening means. Each strut 48 is inclined upwardly and outwardly from the bottom to the top thereof as best illustrated in FIGURE 4. The upper end of each strut 48 is welded or otherwise secured to the longitudinally extending track 44 or 46. With such a construction the tracks 44 and 46 are spaced laterally apart a distance greater than the distance between the rails 25 and 26 of the frame 12 to eliminate interference when the skid or pontoon 49 is mounted on the trailer 10.

The back or rear end of each track 44 and 46 is provided with an upright or upstanding projection or latching element 50 which is used for a purpose to be subsequently described. The front end of each of the tracks 44 and 46 is provided with integral downwardly inclined guide means or sections 52 as will be subsequently described.

The skid or pontoon 49 is adapted to be mounted on the trailer 10 and includes a pair of elongated closed cylinders or tanks 56 and 58 which are interconnected to the under side or bottom of the floor or deck 60 by means of appropriate structural steel braces 62 and 63. The lateral distance between the opposite inner surfaces of the cylinders is greater than the distance between the outside surfaces of the tracks 44 and 46 so as to permit the skid 49 to be slid onto and off from the trailer 10 in a relatively easy manner as will subsequently appear.

The cylinders or tanks 56 and 58 may be filled with air or other gas to permit the skid 49 to float in a body of water such as a lake, river or the like. At such time the floor or deck 60 is supported by the cylinders above the top surface of the water. It should be appreciated that the floor 60 may have mounted thereon an appropriate enclosure, not shown, to provide shelter for the occupant from the sun and other elements. Chairs and other equipment may be utilized on the floor 60.

The skid 49 is provided with a pair of longitudinally extending channel shaped elements 64 and 66. The elements 64 and 66 each include a web 68 which interconnects a pair of side flanges 70 and 72. Each web 68 is appropriately connected to the underside of the floor 60 of the skid by means of bolts or other fastening means, not shown. The side flanges 70 and 72 are arranged substantially parallel in vertical planes as best illustrated in FIGURES 4 and 5.

Each pair of side flanges 70 and 72 are adapted to carry a plurality of transversely extending longitudinally spaced rollers 74. Each of the rollers 74 is mounted on a shaft 76 which extends through openings provided in the flanges 70 and 72. The rollers 74 rotate as the skid 49 is moved along the tracks 44 and 46 provided on the trailer 10. The rollers 74 are spaced on 2 foot centers.

The skid 49 includes a gate 78 which is connected to the front end of the deck or floor 60 by means of a pair of hinges 80. It should be observed when referring to FIGURE 2 that a relatively narrow space 84 is provided between the front edge of the floor 60 and the rear edge of the gate 78.

When the skid 49 is floating in a body of water the gate 78 may be locked in an upright vertical position by suitable means (not shown) or located in a horizontal position to permit a person to use the front end of the skid 49 for swimming, fishing or the like. The skid 49 includes support elements 86 at opposite sides thereof for supporting the gate 78 when in a horizontal position. The load on the gate 78 is carried to the support elements 86 by means of a transversely extending support bar 90 which is illustrated in FIGURE 3.

When the skid 49 is being loaded on the trailer 10, the rollers 74 at the front end thereof are intially placed on the guide means 52. A force is applied so as to push the skid 49 on to the horizontal tracks 44 and 46. During the loading operation, the gate 78 may be in a vertical position or moved back to a horizontal position on top of the floor 60, as illustrated by the dotted lines in FIGURE 3. After the skid 49 is rolled to the back ends of the tracks 44 and 46, as determined by the upright projections 50, the gate 78 is moved from the horizontal position on top of the floor 60 (See FIGURE 3) to the rearwardly extending horizontal position, so that the upright projections 50 may be received in the aforesaid space 84. Thus, the upright projections 50 provide latching means for preventing lengthwise movement of the skid 49 with respect to the trailer 10.

A winch, not shown, may be mounted on the trailer 10 to assist in pulling the skid 49 onto the trailer 10.

It should be understood that the invention may be practiced by mounting the rollers 74 on the frame 12 of the trailer 10 and locating the tracks 44 and 46 on the under side of the pontoon floor 60.

The present invention thus provides a novel welded tubular pipe frame constructed trailer which is adapted to transport a pontoon, houseboat or the like along the highway between a body of water and the owner's house or storage area.

While the invention has been described primarily for use with a pontoon or houseboat, it should be understood that the skid has other applications including the use in industry for carrying objects between plants.

The drawing and the foregoing specification constitute a description of the improved skid and trailer combination in such full, clear, concise and exact terms as to enable any person skilled in the art to practice the invention, the scope of which is indicated by the appended claims.

What we claim as our invention is:

1. In combination, a trailer having a horizontal frame provided with ground engaging wheels and including a pair of longitudinally extending rails and transversely extending members between and connected to said longitudinally extending rails at opposite ends thereof, struts rigid with and extending upwardly from said longitudinally extending rails, a pair of longitudinally extending track members substantially parallel to said rails and rigidly connected to the upper ends of said upwardly extending struts, each of said track members being provided at one end thereof with an upright projection, and a skid mounted upon said trailer, said skid having a floor provided on the underside thereof with rollers engaging said track member and having in spaced relation to one end of said floor a hingedly mounted gate movable from a horizontal position on top of said floor to a rearwardly extending horizontal position, said skid including means for supporting said gate in said rearwardly extending horizontal position, the space aforesaid between one end of said floor and said gate being adapted to receive the upright projections on said track members when said gate is moved to a rearwardly extending horizontal position on said supporting means, whereby the skid may be held against longitudinal displacement from the frame of said trailer.

2. The combination defined in claim 1, wherein the struts are inclined upwardly and outwardly from said longitudinally extending rails, whereby the track members are spaced laterally apart a distance greater than the transverse distance between the longitudinally extending rails, and the skid is provided on the underside of the floor thereof with substantially parallel longitudinally extending closed cylinders spaced laterally apart a distance greater than the transverse distance between the track members, whereby the track members will not interfere with the cylinders of said skid when the latter is loaded onto or unloaded from said trailer.

3. The combination defined in claim 1, wherein the longitudinally extending track members are provided at the ends thereof opposite to said upright projections with integral downwardly inclined portions for the rollers of said skid, to facilitate the movement of said skid when the latter is loaded onto or unloaded from said trailer.

4. The combination defined in claim 1, wherein the floor of the skid is provided on the underside thereof with laterally spaced downwardly opening longitudinally extending channel-shaped elements, and the rollers extend transversely of said channel-shaped members and are supported between and from opposite sides of said channel-shaped members.

5. The combination defined in claim 1, wherein the skid includes laterally spaced longitudinally extending support elements, and the means for supporting said gate in a rearwardly extending position includes a transversely extending bar supported upon said support elements.

References Cited by the Examiner

UNITED STATES PATENTS

| | | | |
|---|---|---|---|
| 1,269,265 | 6/18 | Duggan | 214—3.8 X |
| 1,410,680 | 3/22 | Isenberg et al. | 214—85 |
| 1,870,573 | 8/32 | Kuchar | 214—517 X |
| 2,849,130 | 8/58 | Van Der Velde | 214—85 |
| 2,910,197 | 10/59 | Beckner | 214—84 |
| 2,925,186 | 2/60 | Anderson et al. | 214—517 X |
| 3,074,575 | 1/63 | Terho | 214—515 |
| 3,099,977 | 8/63 | McLarty. | |
| 3,126,855 | 3/64 | Freeburg. | |

FOREIGN PATENTS 188,163  11/22  Great Britain.

HUGO O. SCHULZ, *Primary Examiner.*

GERALD M. FORLENZA, *Examiner.*